(12) United States Patent
Arimoto et al.

(10) Patent No.: US 6,191,895 B1
(45) Date of Patent: Feb. 20, 2001

(54) ZOOM LENS SYSTEM

(75) Inventors: Tetsuya Arimoto; Mamoru Terada, both of Sakai; Takashi Okada, Nishinomiya; Kenji Konno, Sakai; Tetsuo Kohno, Toyonaka; Kazuhiko Ishimaru, Kaizuka, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/165,452

(22) Filed: Oct. 2, 1998

(30) Foreign Application Priority Data

Oct. 3, 1997 (JP) .................................................... 9-270743

(51) Int. Cl.$^7$ ..................................................... G02B 15/14
(52) U.S. Cl. ............................ 359/686; 359/687; 359/688
(58) Field of Search .................................... 359/686, 687, 359/688, 680, 681, 682

(56) References Cited

PUBLICATIONS

U.S. application No. 09/165,452, Kohno, filed Apr. 1999.*

\* cited by examiner

*Primary Examiner*—Scott J. Sugarman
*Assistant Examiner*—Michael A Lucas
(74) *Attorney, Agent, or Firm*—Sidley & Austin

(57) ABSTRACT

A zoom lens system has, from the object side, a first lens unit having a optical power, a second lens unit having a negative optical power a third lens unit having a positive optical power, and a succeeding lens unit. The first and the third lens units monotonically move toward the object side during zooming from the shortest focal length condition to the longest focal length condition. A number of predetermined conditions are disclosed which can be satisfied to ensure a high quality, compact zoom lens for a digital camera.

24 Claims, 6 Drawing Sheets

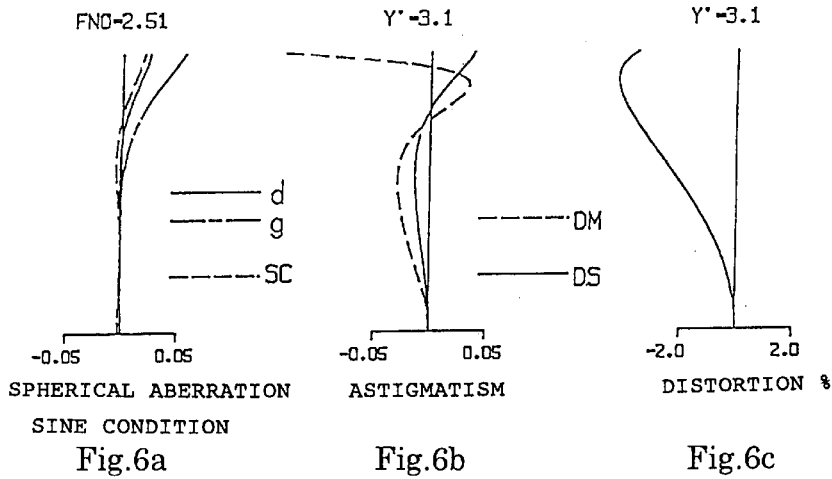
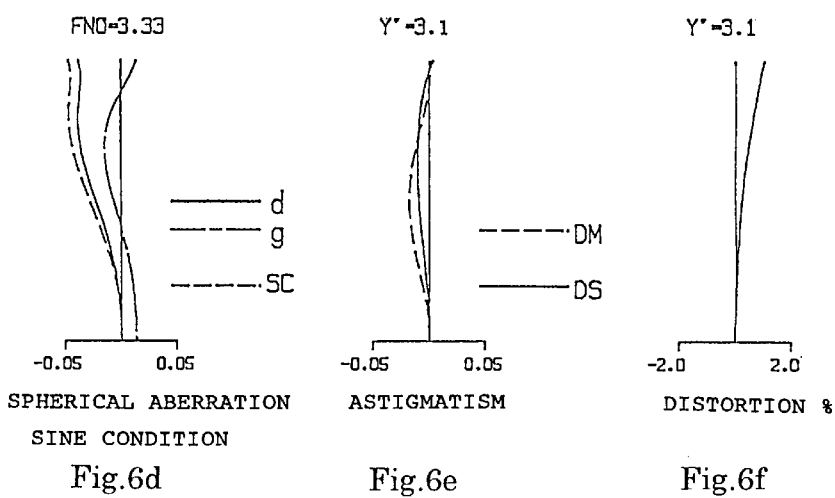
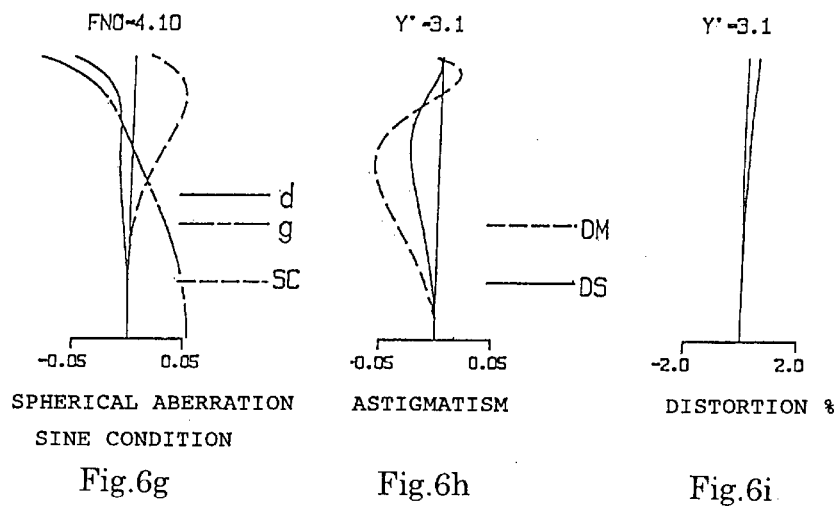

FNO=2.54

— d
----- g
---- SC

-0.05    0.05
SPHERICAL ABERRATION
SINE CONDITION

Y'=3.10

— DS
---- DM

-0.05    0.05
ASTIGMATISM

Y'=3.10

-2.0    2.0
DISTORTION %

FNO=3.30

— d
----- g
---- SC

-0.05    0.05
SPHERICAL ABERRATION
SINE CONDITION

Y'=3.10

— DS
---- DM

-0.05    0.05
ASTIGMATISM

Y'=3.10

-2.0    2.0
DISTORTION %

FNO=4.10

— d
----- g
---- SC

-0.05    0.05
SPHERICAL ABERRATION
SINE CONDITION

Y'=3.10

— DS
---- DM

-0.05    0.05
ASTIGMATISM

Y'=3.10

-2.0    2.0
DISTORTION %

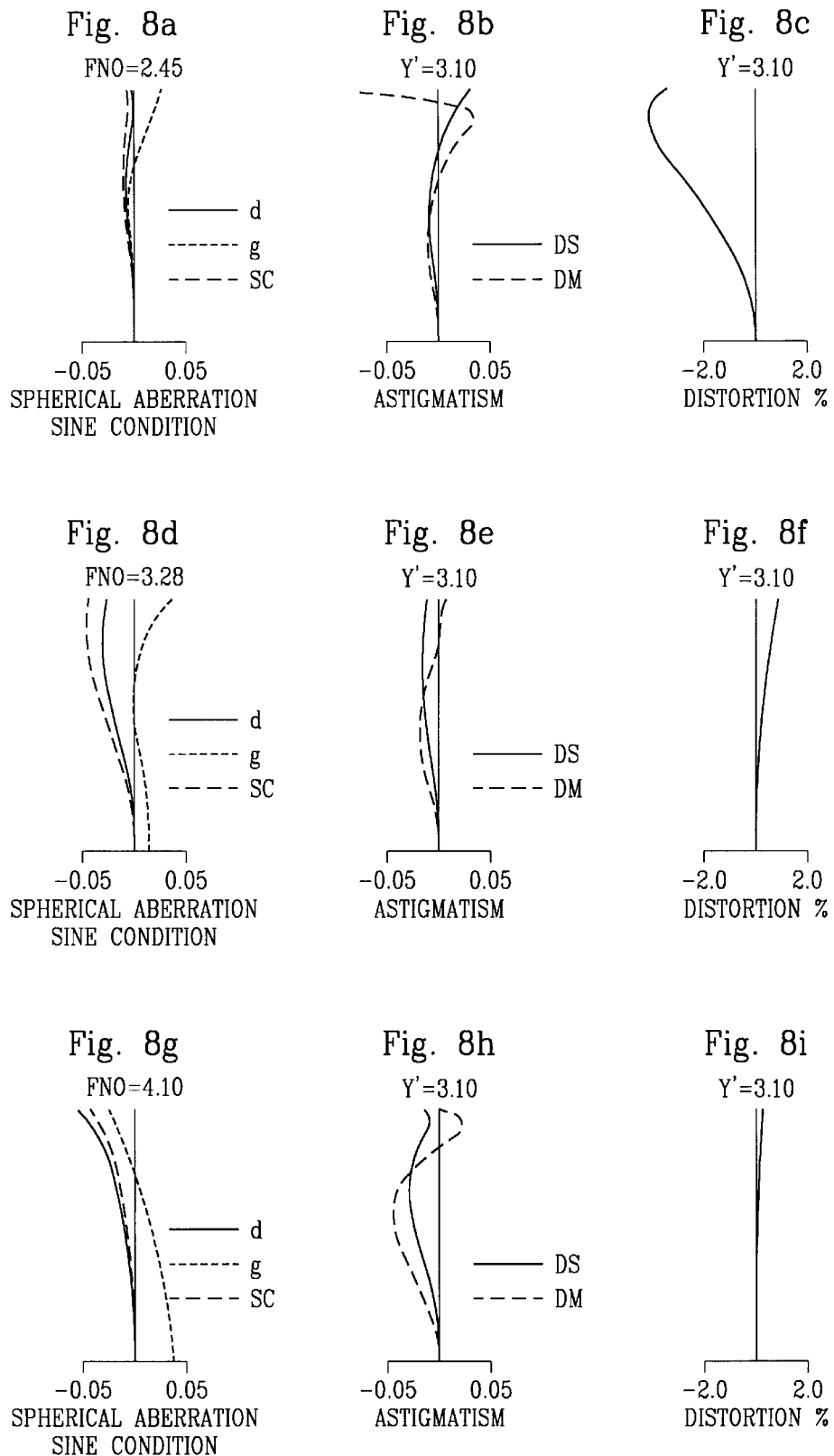

ZOOM LENS SYSTEM

This application is based on the application No. 9-270743 filed in Japan, the contents of which is hereby incorporated by reference.

BACKGROUND OF THE INVENTION

1. Field of the Invention

The present invention relates to a zoom lens system used for a small-size taking optical system, and more specifically, to a compact and high-magnification zoom lens system being suitable for a taking optical system for a digital input/output apparatus such as a digital still camera and a digital video camera.

2. Description of the Related Art

In recent years, with the spread of personal computers, digital still cameras and digital video cameras (hereinafter, referred to as digital cameras) capable of easily capturing image information into digital apparatuses have been spreading among personal users. It is expected that such digital cameras will increasingly spread as image information inputting apparatuses.

Generally, the image quality of a digital camera depends on the number of pixels of the solid-state image sensing device such as a CCD (charge coupled device). At present, the solid-state image sensing device mainly used for consumer digital cameras is a so-called VGA-class solid-state image sensing device having approximately 330 thousand pixels. However, the image quality of the VGA-class camera largely pales in comparison with the image quality of conventional cameras using silver halide film. For this reason, consumer digital cameras have recently been desired to have high image quality exceeding one million pixels, and the taking optical systems of these digital cameras have also been desired to satisfy high image quality.

Since these consumer digital cameras have also been desired to perform zooming, particularly, optical zooming in which image quality degradation is small, digital camera zoom lens systems having high magnification and satisfying high image quality have been required in recent years.

However, conventional digital camera zoom lens systems satisfying the high image quality exceeding one million pixels are mostly interchangeable lens systems for single-lens reflex cameras that are diverted to digital camera taking optical systems, and zoom lens systems for large-size digital cameras for business use. These zoom lens systems are unsuitable for consumer digital cameras because they are large in size and high in cost.

On the other hand, it is considered to divert, to digital camera taking optical systems, taking optical systems for silver halide film lens shutter cameras that have been remarkably reduced in size and increased in magnification in recent years.

However, when a taking optical system for a lens shutter camera is used in a digital camera as it is, it is impossible to sufficiently satisfy the light condensing performance of a micro lens provided on the front surface of the solid-state image sensing device of the digital camera, so that the image brightness extremely differs between the central portion and the peripheral portion of the image. This problem is caused because the off-axial luminous flux exiting from the lens shutter camera taking optical system is obliquely incident on the image plane since the exit pupil of the taking optical system is situated near the image plane. If the distance between the image plane and the exit pupil position of the conventional lens shutter camera taking optical system is increased to solve this problem, the taking optical system will inevitably increase in overall size.

SUMMARY OF THE INVENTION

An object of the present invention is to provide an improved zoom lens system.

Another object of the present invention is to provide a completely novel zoom lens system being compact, having high magnification and satisfying high image quality.

The above-mentioned objects are achieved by a zoom lens system comprising from the object side a first lens unit having a positive optical power, a second lens unit having a negative optical power, a third lens unit having a positive optical power and a succeeding lens unit, wherein the first and the third lens units monotonically move toward the object side during zooming from the shortest focal length condition to the longest focal length condition, and the following conditions are satisfied:

$$0.7 < \frac{m1}{Z} < 3.0$$

$$1 < \frac{\max(T1, T2, T3, T4)}{fw} < 4$$

where

Ti is the axial thickness of the i-th lens unit and max(T1, T2,T3,T4) is the maximum value thereof, m1 is the movement amount (mm) of the first lens unit during zooming from the shortest focal length condition to the longest focal length condition, fw is the overall focal length of the lens system at the shortest focal length condition, and Z is the zoom ratio (the focal length at the shortest focal length condition/the focal length at the longest focal length condition).

The invention itself, together with further objects and attendant advantages, will be understood by reference to the following detailed description taken in conjunction with the accompanying drawings.

BRIEF DESCRIPTION OF THE DRAWINGS

FIGS. 6(a) to 6(i) are graphic representations of aberrations of the zoom lens system of the second embodiment;

FIGS. 8(a) to 8(i) are graphic representations of aberrations of the zoom lens system of the fourth embodiment.

In the following description, like parts are designated by like reference numbers throughout the several drawings.

DETAILED DESCRIPTION OF THE PREFERRED EMBODIMENTS

Hereinafter, preferred embodiments of the present invention will be described with reference to the drawings.

In this specification, "optical power" represents a quantity defined by the reciprocal number of the focal length and includes not only optical power by deflection at a surface of media with refractive indices having different deflecting actions but also optical power by diffraction and deflection by the distribution of refractive index in the medium.

Figure 1:
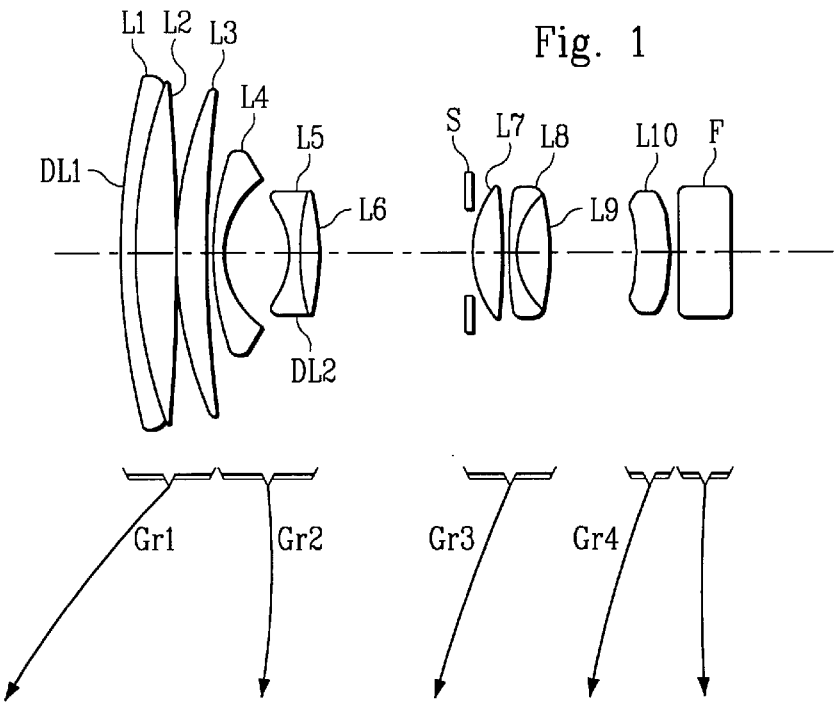
FIG. 1 shows the lens construction of a zoom lens system of a first embodiment.
Figure 2:
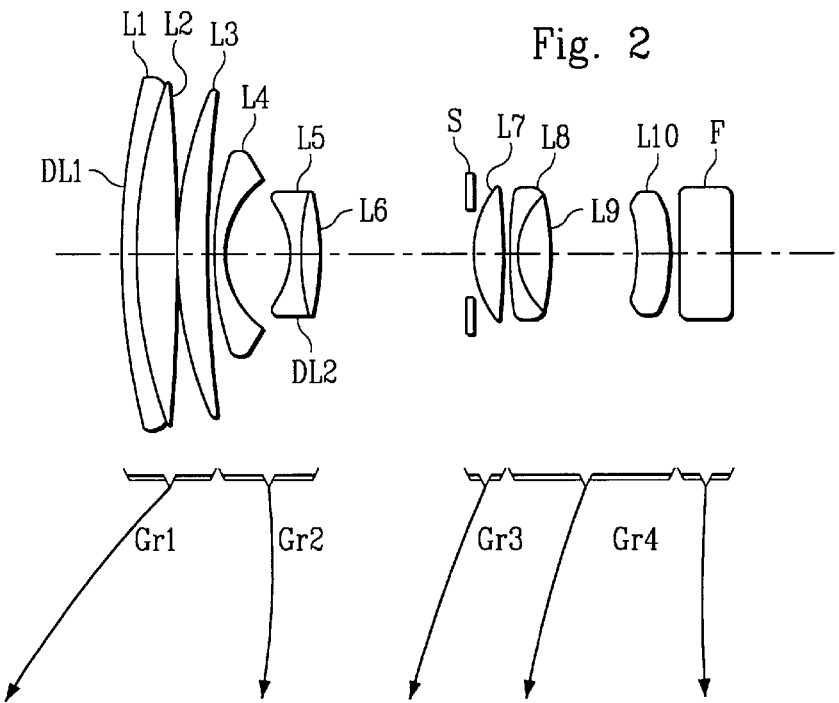
FIG. 2 shows the lens construction of a zoom lens system of a second 15 embodiment.
Figure 3:
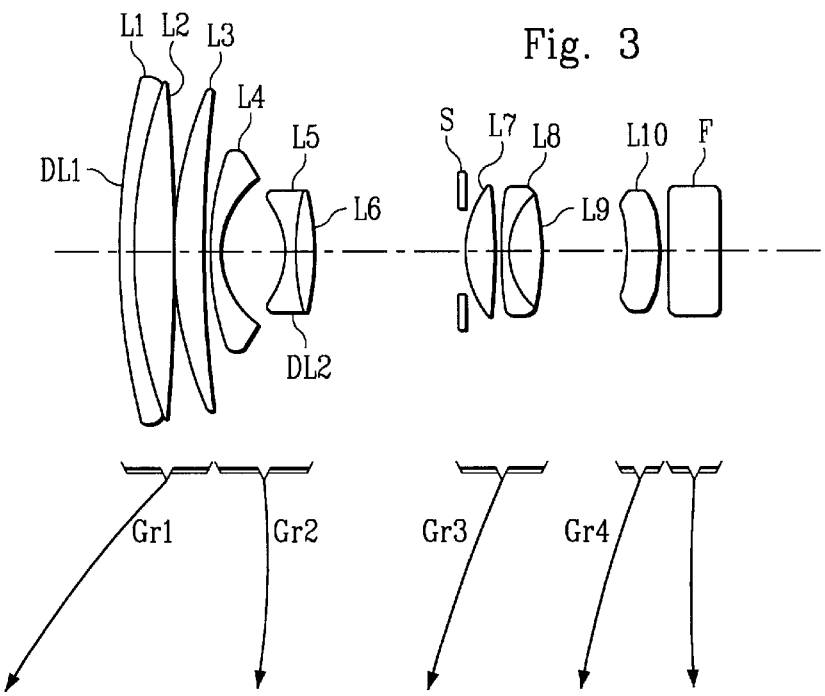
FIG. 3 shows the lens construction of a zoom lens system of a third embodiment.
Figure 4:
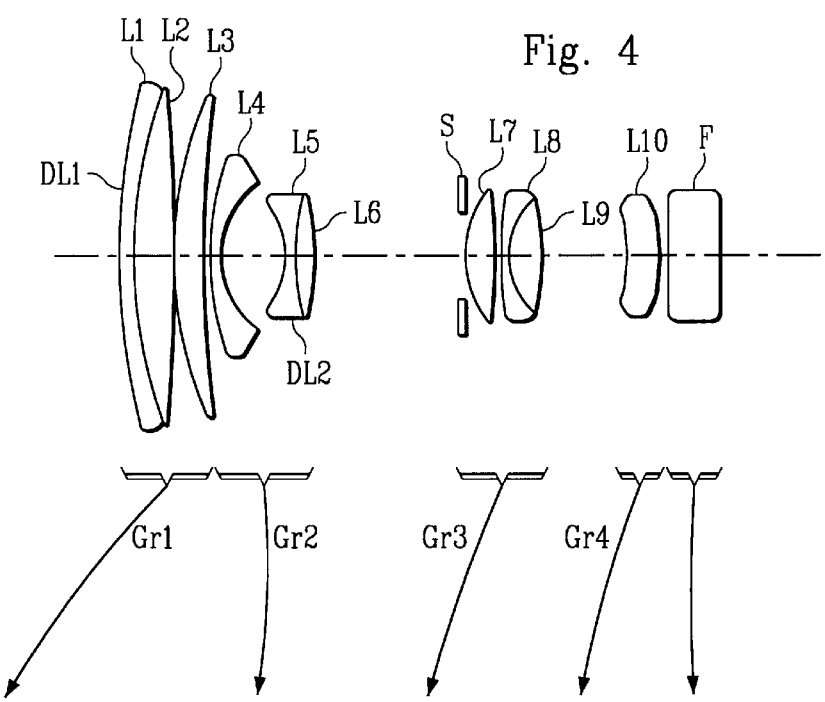
FIG. 4 shows the lens construction of a zoom lens system of a fourth embodiment.

FIGS. 1 to 4 are cross-sectional views showing the lens constructions at the shortest focal length condition of the first to fourth embodiments of the zoom lens system according to the present invention. The zoom lens systems of the embodiments each comprise from the object side a first lens unit Gr1 having a positive optical power, a second lens unit Gr2 having a negative optical power, a third lens unit Gr3 having a positive optical power, and a succeeding lens unit. During zooming from the shortest focal length condition to the longest focal length condition, the first lens unit, the third lens unit and the succeeding lens unit move toward the object side. In the zoom lens systems of the first and the second embodiments, the succeeding lens unit has a positive optical power. In the zoom lens systems of the third and the fourth embodiments, the succeeding lens unit has a negative optical power. The arrows in the figures schematically show the movements of the lens units, diaphragms and low-pass filters during zooming from the shortest focal length condition to the longest focal length condition.

The zoom lens system of the first embodiment comprises from the object side: a first lens unit Gr1 including a doublet lens element DL1 of a negative meniscus lens element L1 convex to the object side and a positive bi-convex lens element L2, and a positive lens element L3 convex to the object side; a second lens unit Gr2 including a positive meniscus lens element L4 convex to the object side, a doublet lens element DL2 of a negative bi-concave lens element L5 and a positive bi-convex lens element L6; a third lens unit Gr3 including a diaphragm S, a positive bi-convex lens element L7, a negative meniscus lens element L8 convex to the object side, and a positive bi-convex lens element L9; a fourth lens unit Gr4 including a positive meniscus lens element L10 concave to the object side; and a low-pass filter F. During zooming from the shortest focal length condition to the longest focal length condition, the first, the third and the fourth lens units move toward the object side, whereas the second lens unit moves slightly toward the image side. The diaphragm S moves integrally with the third lens unit. The low-pass filter F is stationary during zooming.

The zoom lens system of the second embodiment comprises from the object side: a first lens unit Gr1 including a doublet lens element DL1 of a negative meniscus lens element L1 convex to the object side and a positive bi-convex lens element L2, and a positive lens element L3 convex to the object side; a second lens unit Gr2 including a positive meniscus lens element L4 convex to the object side, a doublet lens element DL2 of a negative bi-concave lens element L5 and a positive bi-convex lens element L6; a third lens unit Gr3 including a diaphragm S, and a positive bi-convex lens element L7; a fourth lens unit Gr4 including a negative meniscus lens element L8 convex to the object side, a positive bi-convex lens element L9 and a positive meniscus lens element L10 concave to the object side; and a low-pass filter F. During zooming from the shortest focal length condition to the longest focal length condition, the first, the third and the fourth lens units move toward the object side, whereas the second lens unit moves slightly toward the image side. The diaphragm S moves integrally with the third lens unit. The low-pass filter F is stationary during zooming.

The zoom lens systems of the third and the fourth embodiments each comprise from the object side: a first lens unit Gr1 including a doublet lens element DL1 of a negative meniscus lens element LI convex to the object side and a positive bi-convex lens element L2, and a positive lens element L3 convex to the object side; a second lens unit Gr2 including a positive meniscus lens element L4 convex to the object side, a doublet lens element DL2 of a negative bi-concave lens element L5 and a positive bi-convex lens element L6; a third lens unit Gr3 including a diaphragm S, a positive bi-convex lens element L7, a negative meniscus lens element L8 convex to the object side, and a positive bi-convex lens element L9; a fourth lens unit Gr4 including a negative meniscus lens element L10 concave to the object side; and a low-pass filter F. During zooming from the shortest focal length condition to the longest focal length condition, the first, the third and the fourth lens units move toward the object side, whereas the second lens unit moves slightly toward the image side. The diaphragm S moves integrally with the third lens unit. The low-pass filter F is stationary during zooming.

Subsequently, conditions to be satisfied by the zoom lens systems of the embodiments will be described. It is unnecessary to satisfy all the conditions at the same time.

It is desirable for the zoom lens systems of the embodiments to satisfy the range defined by the following condition (1):

$$3.0 < \frac{f1}{fw} < 9.0 \tag{1}$$

where f1 is the focal length of the first lens unit, and fw is the overall focal length of the lens system at the shortest focal length condition.

The condition (1) defines the focal length of the first lens unit. When the upper limit of the condition (1) is exceeded, the focal length of the first lens unit is too long. This increases the movement amount of the first lens unit during zooming from the shortest focal length condition to the longest focal length condition, so that the overall length of the zoom lens system at the longest focal length condition increases. As a result, it is impossible to obtain a compact zoom lens system. When the lower limit of the condition (1) is exceeded, the optical power of the first lens unit is strong, so that aberration generated in the first lens unit, particularly, spherical aberration on the longer focal length side increases. As a result, it is impossible to obtain excellent optical performance in the zoom lens system as a whole.

With respect to the condition (1), it is more desirable to satisfy the following ranges in the order of (1a) to (1c):

$$3.5 < \frac{f1}{fw} < 9.0 \tag{1a}$$

$$4.5 < \frac{f1}{fw} < 9.0 \tag{1b}$$

$$5.0 < \frac{f1}{fw} < 9.0 \tag{1c}$$

It is desirable for the zoom lens systems of the embodiments to satisfy the range defined by the following condition (2):

$$-1.3 < \frac{f2}{fw} < -0.7 \quad (2)$$

where
f2 is the focal length of the second lens unit.

The condition (2) defines the focal length of the second lens unit. When the lower limit of the condition (2) is exceeded, the focal length of the second lens unit is short. This increases the axial distance between the second lens unit and the succeeding lens unit at the shortest focal length condition, so that the overall length at the shortest focal length condition is too large. As a result, the diameters of the lens elements included in the first and the second lens units increase. When the upper limit of the condition (2) is exceeded, the optical power of the second lens unit is strong. This increases aberration generated in the second lens unit, particularly, it increases the Petzval sum toward the negative side, so that the overall Petzval sum excessively increases toward the negative side. As a result, it is impossible to obtain excellent optical performance in the zoom lens system as a whole.

With respect to the condition (2), it is more desirable to satisfy the following ranges in the order of (2a) and (2b):

$$-1.3 < \frac{f2}{fw} < -0.8 \quad (2a)$$

$$-1.4 < \frac{f2}{fw} < -0.8 \quad (2b)$$

It is desirable for the zoom lens systems of the embodiments to satisfy the range defined by the following condition (3):

$$1.1 < \frac{f34w}{fw} < 1.9 \quad (3)$$

where
f34w is the composite focal length of the succeeding lens units at the shortest focal length condition.

The condition (3) defines the composite focal length of the succeeding lens units. When the upper limit of the condition (3) is exceeded, the composite focal length of the succeeding lens units is too long, so that the overall length at the longest focal length condition is too long. As a result, it is impossible to obtain a compact zoom lens system. When the lower limit of the condition (3) is exceeded, the composite optical power of the succeeding lens units is strong, so that aberration generated in the succeeding lens units, particularly, coma increases. Since the coma cannot be corrected by the provision of an aspherical surface in any position in the zoom lens system, it is impossible to obtain excellent optical performance in the zoom lens system as a whole.

With respect to the condition (3), it is more desirable to satisfy the following range (3a):

$$1.8 < \frac{f34w}{fw} < 1.9 \quad (3a)$$

It is desirable for the zoom lens systems of the embodiments to satisfy the range defined by the following condition (4):

$$1.0 < img*R < 15.0 \quad (4)$$

where
img is the maximum image height (the unit is mm), and
R is the effective aperture (the unit is mm) of a lens surface in the zoom lens system situated on the most image side except the filter.

The condition (4) is for balancing conditions for the size as the zoom lens system diameter and correction of aberrations with conditions particular to digital camera taking optical systems. Generally, in a taking optical system used in a digital camera using a solid-state image sensing device, it is necessary that the incident luminous flux be made incident substantially vertically to the luminous flux of a micro lens provided on the front surface of the solid-state image sensing device in order to sufficiently satisfy the light condensing performance of the micro lens. For this reason, in a taking optical system for digital cameras, not only aberrations are necessarily corrected like in a taking optical system for silver halide film cameras but also the digital camera taking optical system are required to be substantially telecentric to the image side. When the upper limit of the condition (4) is exceeded, the zoom lens system is substantially telecentric to the image side more than necessary. This excessively increases aberrations, particularly, negative distortion on the shorter focal length side, so that it is difficult to correct it and the field tilt toward the under side is great. When the lower limit of the condition (4) is exceeded, it is difficult that the zoom lens system is substantially telecentric. Particularly, if telecentricity is improved with the lower limit exceeded, the back focal length of the zoom lens system is unnecessarily long, so that the optical system increases in size.

With respect to the condition (4), it is more desirable to satisfy the following range (4a):

$$6.5 < img*R < 9.5 \quad (4a)$$

In a zoom lens system comprising from the object side the first lens unit having a positive optical power, the second lens unit having a negative optical power and the succeeding lens units like the zoom lens systems of the embodiments, it is desirable that the object side that is closest to the second lens unit comprise a positive lens component including a positive lens element having a strong curvature surface on the image side, and a negative lens component including at least one negative lens element. This construction enables aberrations to be excellently corrected.

It is desirable for the positive lens element disposed on the most object side of the succeeding lens units to satisfy the range defined by the following condition (5):

$$0.1 < \frac{Ra}{f34w} < 3.0 \quad (5)$$

where
Ra is the radius of curvature of the image side surface of the positive lens element disposed on the most object side of the succeeding lens units, and
f34w is the composite focal length of the succeeding lens units.

The condition (5) defines the ratio of the radius of curvature of the image side surface of the positive lens element disposed on the most object side of the succeeding lens units to the composite focal length of the succeeding lens units, and is related to the aberration correcting performance of the positive lens element. When the upper limit of the condition (5) is exceeded, the curvature of the image side surface of the positive lens element is too weak, so that the tendency of spherical aberration to tilt toward the over side increases. When the lower limit of the condition (5) is exceeded, the curvature of the image side surface of the positive lens element is too strong, so that the tendency of spherical aberration to tilt toward the under side increases. Further, when the lower limit of the condition (5) is exceeded, the radius of curvature of the image side surface of the positive lens element is too small and it is difficult to manufacture such a lens element.

In a zoom lens system comprising from the object side the first lens unit having a positive optical power, the second lens unit having a negative optical power and the third lens unit having a positive optical power like the zoom lens systems of the embodiments, it is desirable for the second lens unit to comprise from the object side a first sub unit including a lens element having a strong curvature concave surface on the image side, and a second sub unit including at least one positive lens element on the object side and one negative lens element. By thus constructing the second lens unit, when the ray exits from the strong curvature concave surface in the first sub unit of the second lens unit, the exit angle of the off-axial ray and the exit angle of the axial ray decrease, particularly, on the shorter focal length side, so that correction of aberrations in the second sub unit of the second lens unit and in the lens unit succeeding the second sub unit is facilitated.

It is desirable for the concave surface of the first sub unit of the second lens unit to satisfy the range defined by the following condition (6):

$$-1.6 < \frac{R2n}{f2} < -0.6 \qquad (6)$$

where

R2n is the radius of curvature of the concave surface of the first sub unit of the second lens unit, and f2 is the focal length of the second lens unit.

The condition (6) defines the ratio of the radius of curvature of the strong curvature concave surface of the first sub unit of the second lens unit to the focal length of the second lens unit, and is related to the aberration correcting performance of the concave surface. When the lower limit of the condition (6) is exceeded, the curvature of the concave surface is too weak, so that the above-mentioned action, that is, the action of decreasing the exit angle of the off-axial ray and the exit angle of the axial ray when the ray incident on the concave surface exits from the concave surface cannot be sufficiently achieved. Consequently, when the lower limit of the condition (6) is exceeded, the ray exiting from the first sub unit of the second lens unit is incident on the succeeding lens units with the angles of the off-axial ray and the axial ray being large, so that aberrations on the image plane, particularly, field curvature and coma cannot be corrected in the succeeding lens units. When the upper limit of the condition (6) is exceeded, the curvature of the concave surface is too strong, so that extremely large aberration is generated at the concave surface only by the concave surface. As a result, it is impossible to correct the aberration with other surfaces. Further, when the upper limit of the condition (6) is exceeded, the radius of curvature of the concave surface is too small and it is difficult to manufacture such a lens element.

It is desirable for the second sub unit of the second lens unit to comprise from the object side a positive single bi-convex lens element and a doublet lens element of a positive lens element having a convex surface on the image side and a negative bi-concave lens element. The second lens unit is overall negative. However, when chromatic aberration is corrected in the second lens unit, it is necessary that one positive lens element and at least one negative lens element be included at least in the second lens unit. On the other hand, in the first sub unit of the second lens unit, since the strong curvature concave surface exists on the image side, in order to achieve the action of the concave surface, it is impossible to use a positive lens element having a strong optical power for correcting chromatic aberration generated at the concave surface. Therefore, to correct the overall chromatic aberration in the second lens unit, it is desirable for the second sub unit of the second lens unit to comprise a positive single bi-convex lens element and a doublet lens element of a positive lens element having a convex surface on the image side and a negative bi-concave lens element.

As described above, when the first lens unit comprises from the object side a negative lens element having a convex surface on the object side, a positive bi-convex lens element and a positive lens element having a convex surface on the object side, it is desirable to satisfy the ranges defined by the following conditions (7) and (8):

$$vn < 35 \qquad (7)$$
$$vp > 50 \qquad (8)$$

where in is the Abbe number of the negative lens element of the first lens unit, and vp is the Abbe number of the positive lens elements of the first lens unit.

The conditions (7) and (8) are for correcting chromatic aberration in the first lens unit. By appropriately defining the Abbe numbers of the negative lens element and the positive lens elements of the first lens unit, chromatic aberration in the first lens unit is excellently corrected.

With respect to the condition (7), chromatic aberration is more excellently corrected by satisfying the following ranges (7a) and (7b):

$$vn < 32 \qquad (7a)$$
$$vn < 30 \qquad (7b)$$

In the zoom lens systems of the embodiments, the first lens unit moves toward the object side during zooming from the shortest focal length condition to the longest focal length condition. This construction is preferable because the overall length of the zoom lens system at the shortest focal length condition can be reduced and the diameters of the lens elements included in the first lens unit can be reduced.

When the first lens unit moves toward the object side during zooming from the shortest focal length condition to the longest focal length condition, it is desirable to satisfy the range defined by the following condition (9):

$$0.7 < \frac{m1}{Z} < 3.0 \qquad (9)$$

where m1 is the movement amount (mm) of the first lens unit during zooming from the shortest focal length condition to the longest focal length condition, and Z is the zoom ratio (the focal length at the shortest focal length condition/the focal length at the longest focal length condition).

The condition (9) shows the relationship between the zoom ratio and the movement amount of the first lens unit during zooming from the shortest focal length condition to the longest focal length condition. Generally, the movement amount increases with increasing zoom ratio. The condition (9) is for appropriately defining the movement amount of the first lens unit to provide a zoom lens system being compact and having excellent optical performance. When the upper limit of the condition (9) is exceeded, the movement amount of the first lens unit is too large compared to the zoom ratio, so that the overall length at the longest focal length condition is too long. As a result, it is impossible to obtain a compact zoom lens system. When the lower limit of the condition (9) is exceeded, the movement amount of the first lens unit is too small. When the movement amount of the first lens unit is small, the zoom ratio cannot be achieved unless the optical power of the first lens unit is increased. Consequently, the optical power of the first lens unit is too strong, so that the amount of aberrations generated in the first lens unit increases. As a result, it is impossible to obtain excellent optical performance in the zoom lens system as a whole.

With respect to the condition (9), it is more desirable to satisfy the following range (9a):

$$0.8 < \frac{m1}{Z} < 3.0 \qquad (9a)$$

When the first lens unit moves toward the object side during zooming from the shortest focal length condition to the longest focal length condition, it is desirable to satisfy the range defined by the following condition (10):

$$0.8 < \frac{M1wm}{M1mt} < 2.5 \qquad (10)$$

where

M1wm is the movement amount of the first lens unit from the shortest focal length condition to the middle focal length condition, and M1wt is the movement amount of the first lens unit from the middle focal length condition to the longest focal length condition. Here, the middle focal length is obtained by $$\sqrt{fw*ft}$$

where fw is the focal length at the shortest focal length condition and ft is the focal length at the longest focal length condition.

The condition (10) defines the ratio of the movement amount of the first lens unit from the shortest focal length condition to the middle focal length condition to the movement amount from the middle focal length condition to the longest focal length condition, and means that the movement amount of the first lens unit is varied more from the shortest focal length condition to the middle focal length condition than from the middle focal length condition to the longest focal length condition. In particular, by the movement amount of the first lens unit from the shortest focal length condition to the middle focal length condition being comparatively large, the distance between the image plane and the entrance pupil position in the middle focal length range can be increased, so that flare components of the off-axial ray can be removed.

With respect to the condition (10), it is more desirable to satisfy the following ranges (10a) and (10b):

$$0.9 < \frac{M1wm}{M1mt} < 2.5 \qquad (10a)$$

$$1.2 < \frac{M1wm}{M1mt} < 2.2 \qquad (10b)$$

It is desirable for the zoom lens systems of the embodiments to satisfy the range defined by the following condition (11):

$$1 < \frac{\max(T1, T2, T3, T4)}{fw} < 4 \qquad (11)$$

where

Ti is the axial thickness of the i-th lens unit and max(T1, T2,T3,T4) is the maximum value thereof.

The condition (11) is for achieving a small-size and high-magnification zoom lens system. When the lower limit of the condition (11) is exceeded, the axial thicknesses of the lens units are too small, so that not only it is difficult to ensure processing requirements (the axial thickness, the edge thickness, etc.) required of the lens elements included in the lens units but also it is impossible to ensure the degree of design freedom necessary for aberration correction. When the upper limit of the condition (11) is exceeded, the axial thicknesses of the lens units are too large, so that it is impossible to achieve a compact zoom lens system.

With respect to the condition (11), it is more desirable to satisfy the following range (11a):

$$1 < \frac{\max(T1, T2, T3, T4)}{fw} < 3 \qquad (11a)$$

It is desirable for the zoom lens systems of the embodiments to satisfy the range defined by the following condition (12):

$$6 < \frac{Lw}{fw} < 10 \qquad (12)$$

where

Lw is the overall length (from the lens front end to the image plane) of the optical system at the shortest focal length condition.

The condition (12) shows the telephoto ratio at the shortest focal length condition. When the lower limit of the condition (12) is exceeded, the overall length of the optical system is too small, so that it is difficult to correct aberration. Further, it is difficult to satisfy the substantial telecentricity required of digital camera taking optical systems. When the upper limit of the condition (12) is exceeded, it is impossible to achieve size reduction. Further, to ensure the illumination on the image plane, the diameter of the front lens element is necessarily increased as the overall length increases, so that it is impossible to achieve a compact zoom lens system.

In a zoom lens system, the focal length is varied by varying the distances between the lens units, in other words, by varying the magnifications (β) of the lens units. Therefore, a lens unit whose magnification largely varies during zooming largely contributes to zooming and the load of aberration on the lens unit is inevitably heavy. In view of this, to perform zooming with efficiency, it is desirable that the load of zooming be imposed on the lens units of the zoom lens system as equally as possible. When the equal imposition of the load of zooming is realized, the load of aberration is also equally imposed on the lens units. In this case, it is considered that the construction (i.e. the number of lens elements and the size) of the lens units of the zoom lens system is optimized.

From this viewpoint, it is desirable for the zoom lens systems of the embodiments to satisfy the range defined by the following condition (13):

$$0.2 < \frac{\Delta\beta 3}{\Delta\beta 2} < 1.0 \quad (13)$$

where
- $\Delta\beta 2$ is the lateral magnification ratio (the lateral magnification at the longest focal length condition/the lateral magnification at the shortest focal length condition) of the second lens unit, and
- $\Delta\beta 3$ is the lateral magnification ratio (the lateral magnification at the longest focal length condition/the lateral magnification at the shortest focal length) of the succeeding lens unit.

The condition (13) shows the load of zooming on the second and the succeeding lens units. The load of zooming on the second lens unit is heavy in known zoom lens systems. However, by the succeeding lens unit sharing the load of zooming, zooming can be performed with efficiency, the length of the optical system is reduced and the number of elements of the lens units is reduced. When the lower limit of the condition (13) is exceeded, the load of zooming on the succeeding lens unit decreases and the load of zooming on the second lens unit increases, so that spherical aberration on the longer focal length side tends to tilt toward the under side and distortion on the shorter focal length increases. As a result, it is impossible to correct aberration. When the upper limit of the condition (13) is exceeded, the load of zooming on the succeeding lens unit increases, so that spherical aberration on the longer focal length side tilts toward the over side and off-axial coma is generated both on the longer and the shorter focal length sides. As a result, it is impossible to correct aberration with other elements. In either case, aberration cannot be sufficiently corrected unless the construction is changed, so that to increase the degree of design freedom, the number of lens elements and the size of the lens system are inevitably increased.

With respect to the condition (13), it is more desirable to satisfy the following ranges (13a) to (13c):

$$0.25 < \frac{\Delta\beta 3}{\Delta\beta 2} < 1.0 \quad (13a)$$

$$0.5 < \frac{\Delta\beta 3}{\Delta\beta 2} < 1.0 \quad (13b)$$

$$0.7 < \frac{\Delta\beta 3}{\Delta\beta 2} < 1.0 \quad (13c)$$

It is desirable for the zoom lens systems of the embodiments to satisfy the range defined by the following condition (14):

$$3.5 < \frac{\beta t2}{\beta w2} < 6.5 \quad (14)$$

where
- $\beta t2$ is the lateral magnification of the second lens unit at the longest focal length condition, and
- $\beta w2$ is the lateral magnification of the second lens unit at the shortest focal length condition.

The condition defines variation in lateral magnification of the second lens unit during zooming and defines the load of zooming on the second lens unit. When the upper limit of the condition (14) is exceeded, the load of zooming on the second lens unit is too heavy, so that spherical aberration on the longer focal length side tends to tilt toward the under side and distortion on the shorter focal length side increases. As a result, it is impossible to correct aberration. When the lower limit of the condition (14) is exceeded, the load of zooming on the second lens unit decreases and the load on other lens units increases, so that spherical aberration on the longest focal length side tilts toward the over side and off-axial coma increases both on the shorter and the longer focal length sides.

$$4.5 < \frac{ft}{|f12w|} < 15 \quad (15)$$

where
- ft is the focal length at the longest focal length condition, and
- f12w is the composite focal length of the first and the second lens units at the shortest focal length condition.

The condition (15) defines the composite focal length of the first and the second lens units at the longest focal length condition, and is for achieving a small-size and high-magnification zoom lens system. When the lower limit of the condition (15) is exceeded, the composite focal length of the first and the second lens units on the shorter focal length side is too long, so that it is difficult to secure the back focal length. In addition, the optical power of the first or the second lens unit is too weak, so that it is impossible to achieve a compact zoom lens system. When the upper limit of the condition (15) is exceeded, the composite focal length of the first and the second lens units on the shorter focal length side is too short, so that it is difficult to correct distortion on the shorter focal length side. In addition, the optical power of the first or the second lens unit is too strong, so that it is difficult to correct aberration.

In the zoom lens systems of the embodiments, it is desirable for the succeeding lens unit to have at least one aspherical surface satisfying the range defined by the condition (16):

$$-0.1 < \phi \cdot (N' - N) \cdot \frac{d}{dH}\{X(H) - X0(H)\} < 0 \quad (16)$$

where
- $\phi$ is the optical power of the aspherical surface,
- N is the refractive index to the d-line of a medium on the object side of the aspherical surface,
- N' is the refractive index to the d-line of a medium on the image side of the aspherical surface,
- H repressnts a height in the direction perpendicular to the optical axis,
- X(H) represents the amount of axial displacement at the height H (with the vertex as the reference),
- X0(H) represents the amount of axial displacement of reference spherical surface at the height H.

Of aspherical surfaces provided in the succeeding lens unit, an aspherical surface provided comparatively on the object side is effective mainly in correcting spherical aberration on the shorter focal length side. The lens surface comparatively near the image side is effective in correcting the image plane quality and flare on the longer focal length side. In the succeeding lens unit, when an aspherical surface is provided in a direction that decreases the positive optical power of a lens element near the object side, spherical aberration on the shorter focal length side is under-corrected when the optical power is too weak, and spherical aberration is over-corrected when the optical power is too strong. In either case, it is difficult to correct aberration with the succeeding part of the optical system unless the construction is changed. As a result, the number of lens elements or the size of the optical system is inevitably increased for aberration correction. With respect to an aspherical surface provided in a direction that decreases the negative optical power in a lens element near the image side in the succeeding lens unit, the upper side convergence of the off-axial ray on the longer focal length side deteriorates when the negative optical power is too weak, so that flare is excessively generated. As a result, the image plane quality degrades. On the shorter focal length side, the influence on the off-axial ray is too great, so that negative distortion is excessively generated. When the negative optical power is too strong, the off-axial ray on the shorter focal length side is influenced, so that the image plane quality on the shorter focal length side degrades. Specifically, the off-axial image plane on the shorter focal length side tilts toward the positive side, so that it is impossible to correct aberration with other surfaces.

In the embodiments, it is desirable to dispose the diaphragm between the second lens unit and the succeeding lens unit. By disposing the diaphragm between the second lens unit and the succeeding lens unit, the quantity of peripheral light can be well-balancedly prevented from decreasing in zooming from the shortest focal length condition to the longest focal length condition.

It is desirable that the open aperture value is fixed during zooming. Typically, a diaphragm stops down a lens by opening and closing the diaphragm blades with respect to the circular aperture corresponding to the minimum f-number. In consideration of the influence on the image, it is desirable that the open aperture be circular. Therefore, when the influence on the image is considered, if the open aperture value differs among the focal length conditions during zooming, it will be necessary to control the diaphragm according to whether the circular aperture is achieved by the diaphragm blades or by arranging a plurality of circular apertures. However, when the circular aperture is achieved by the diaphragm blades, the aperture is distorted with a small number of diaphragm blades and in order for the aperture to be close to a circle, as many as five or six blades are necessary. This increases the cost. When a plurality of circular apertures are provided, not only the cost increases but also the size of the optical system increases because a space is necessary for inserting the circular apertures in the direction of the optical axis.

Subsequently, concrete examples of the embodiments of the present invention will be shown with reference to construction data and graphic representations of aberrations.

First to fourth examples shown below correspond to the above-described first to the fourth embodiments, respectively, and the lens constructions in FIGS. 1 to 4 show the lens constructions of the corresponding first to fourth examples.

In the examples, ri (i=1,2,3, . . . ) represents the radius of curvature of the i-th surface counted from the object side, di (i=1,2,3, . . . ) represents the i-th axial distance counted from the object side, Ni (i=1,2,3, . . . ) and νi (i=1,2,3, . . . ) represent the refractive index and the Abbe number to the d-line of the i-th lens element counted from the object side, f represents the overall focal length of the lens system, and FNO represents the f-number. In the examples, the overall focal lengths f, the f-numbers FNO and the air distances (axial distances) between the lens units correspond, from the left, to the values at the shortest focal length condition (wide angle condition) (W), at the middle focal length condition (M) and at the longest focal length condition (telephoto condition) (T).

Further, in the examples, the surfaces marked with asterisks at the radius of curvature ri are aspherical dioptric surfaces or surfaces having refracting action equivalent to aspherical surfaces. These surfaces are defined by the following expression representing the surface configuration of an aspherical surface:

$$X(H) = \frac{C \cdot H^2}{1 + \sqrt{1 - \varepsilon \cdot C^2 \cdot H^2}} + \sum_{i \geq 2} A_i \cdot H^i \qquad (AS)$$

where

H represnts a height in the direction perpendicular to the optical axis,

X(H) represents the amount of axial displacement at the height H (with the vertex as the reference), C represents a paraxial curvature, ε represents quadric surface parameter, and Ai represents i-th aspherical surface coefficient.

TABLE 1

1st Embodiment f = 5.10~16.00~48.70
Fno. = 2.51~3.35~4.10

| Radius of Curvature | | Axial Distance | | Refractive Index | | Abbe Number | |
|---|---|---|---|---|---|---|---|
| r1 = | 43.485 | | | | | | |
| | | d1 = | 0.60 | N1 = | 1.846786 | ν1 = | 24.19 |
| r2 = | 25.180 | | | | | | |
| | | d2 = | 2.67 | N2 = | 1.603339 | ν2 = | 58.77 |
| r3 = | −240.738 | | | | | | |
| | | d3 = | 0.10 | | | | |
| r4 = | 22.073 | | | | | | |
| | | d4 = | 1.88 | N3 = | 1.487490 | ν3 = | 70.44 |
| r5 = | 64.949 | | | | | | |
| | | d5 = | 0.50~11.79~20.23 | | | | |
| r6 = | 38.754 | | | | | | |
| | | d6 = | 0.60 | N4 = | 1.487490 | ν4 = | 70.44 |
| r7 = | 5.348 | | | | | | |
| | | d7 = | 4.28 | | | | |
| r8 = | −5.604 | | | | | | |
| | | d8 = | 0.80 | N5 = | 1.754500 | ν5 = | 51.57 |
| r9 = | 12.082 | | | | | | |
| | | d9 = | 1.08 | N6 = | 1.823570 | ν6 = | 23.26 |
| r10 = | −26.998 | | | | | | |
| | | d10 = | 9.79~4.10~0.50 | | | | |
| r11 = | ∞ | | | | | | |
| | | d11 = | 0.10 | | | | |
| r12* = | 5.671 | | | | | | |
| | | d12 = | 1.63 | N7 = | 1.678760 | ν7 = | 54.55 |
| r13* = | −39.435 | | | | | | |
| | | d13 = | 0.59 | | | | |
| r14 = | 21.973 | | | | | | |
| | | d14 = | 0.60 | N8 = | 1.848145 | ν8 = | 29.07 |
| r15 = | 4.727 | | | | | | |
| | | d15 = | 0.16 | | | | |
| r16 = | 5.089 | | | | | | |
| | | d16 = | 1.78 | N9 = | 1.487490 | ν9 = | 70.44 |
| r17 = | −13.897 | | | | | | |

TABLE 1-continued

1st Embodiment

| | | | | | | |
|---|---|---|---|---|---|---|
| r18* = | −27.403 | d17 = | 5.48~5.88~6.95 | | | |
| r19* = | −26.152 | d18 = | 2.00 | N10 = 1.686987 | ν10 = | 54.17 |
| r20 = | ∞ | d19 = | 0.50~5.16~8.60 | | | |
| r21 = | ∞ | d20 = | 3.40 | | | |

[Aspherical Coefficient]

r6

A4 = 3.35912 × 10$^{-4}$
A6 = −4.28882 × 10$^{-6}$
A8 = 3.21401 × 10$^{-7}$
A10 = −1.00459 × 10$^{-8}$
A12 = 1.60788 10$^{-10}$ r12

ε = 1.0000
A4 = −4.31487 × 10$^{-4}$
A6 = −5.81698 × 10$^{-6}$
A8 = −2.77738 × 10$^{-7}$
A10 = −1.56834 × 10$^{-8}$
A12 = −1.14364 × 10$^{-10}$ r13

ε = 1.0000
A4 = 4.57854 × 10$^{-4}$
A6 = −3.77256 × 10$^{-6}$
A8 = −1.65743 × 10$^{-7}$
A10 = −1.25149 × 10$^{-8}$
A12 = −2.98557 × 10$^{-10}$ r18

ε = 1.0000
A4 = −2.37217 × 10$^{-3}$
A6 = −1.13408 × 10$^{-4}$
A8 = 3.91580 × 10$^{-6}$
A10 = −7.54419 × 10$^{-7}$
A12 = 1.09256 × 10$^{-8}$ r19

ε = 1.0000
A4 = −1.85727 × 10$^{-3}$
A6 = −2.32142 × 10$^{-5}$
A8 = −3.49611 × 10$^{-6}$
A10 = 3.43249 × 10$^{-7}$
A12 = −1.40106 × 10$^{-8}$

TABLE 2

2nd embodiment f = 510~1600~48.70
Fno. = 2.51~3.35~4.10

| Radius of Curvature | | Axial Distance | | Refractive Index | | Abbe Number | |
|---|---|---|---|---|---|---|---|
| r1 = | 40.667 | | | | | | |
| | | d1 = | 0.60 | N1 = 1.846000 | ν1 = | 23.82 | |
| r2 = | 24.142 | | | | | | |
| | | d2 = | 2.72 | N2 = 1.605533 | ν2 = | 58.62 | |
| r3 = | −300.020 | | | | | | |
| | | d3 = | 0.10 | | | | |
| r4 = | 22.301 | | | | | | |
| | | d4 = | 1.83 | N3 = 1.487490 | ν3 = | 70.44 | |
| r5 = | 47.489 | | | | | | |
| | | d5 = | 0.50~12.00~20.31 | | | | |
| r6* = | 44.218 | | | | | | |
| | | d6 = | 0.60 | N4 = 1.487490 | ν4 = | 70.44 | |
| r7 = | 5.359 | | | | | | |

TABLE 2-continued

2nd embodiment

| | | | | | | |
|---|---|---|---|---|---|---|
| | | d7 = | 4.23 | | | |
| r8 = | −5.504 | | | | | |
| | | d8 = | 0.60 | N5 = 1.754500 | ν5 = | 51.57 |
| r9 = | 13.209 | | | | | |
| | | d9 = | 1.06 | N6 = 1.829885 | ν6 = | 23.40 |
| r10 = | −24.893 | | | | | |
| | | d10 = | 9.78~4.13~0.50 | | | |
| r11 = | ∞ | | | | | |
| | | d11 = | 0.10 | | | |
| r12* = | 5.654 | | | | | |
| | | d12 = | 1.68 | N7 = 1.680817 | ν7 = | 54.46 |
| r13* = | −23.784 | | | | | |
| | | d13 = | 0.76~0.88~1.05 | | | |
| r14 = | 85.713 | | | | | |
| | | d14 = | 0.60 | N8 = 1.848308 | ν8 = | 29.78 |
| r15 = | 5.232 | | | | | |
| | | d15 = | 0.13 | | | |
| r16 = | 5.474 | | | | | |
| | | d16 = | 1.79 | N9 = 1.487490 | ν9 = | 70.44 |
| r17 = | −11.353 | | | | | |
| | | d17 = | 4.85 | | | |
| r18* = | −36.476 | | | | | |
| | | d18 = | 2.00 | N10 = 1.649247 | ν10 = | 56.01 |
| r19* = | −33.225 | | | | | |
| | | d19 = | 0.50~5.28~9.68 | | | |
| r20 = | ∞ | | | | | |
| | | d20 = | 3.40 | | | |
| r21 = | ∞ | | | | | |

[Aspherical Coefficient]

r6

ε = 1.0000
A4 = 4.01804 × 10$^{-4}$
A6 = −4.82526 × 10$^{-6}$
A8 = 3.16650 × 10$^{-7}$
A10 = −9.74906 × 10$^{-9}$
A12 = 1.72024 × 10$^{-10}$ r12

ε = 1.0000
A4 = −4.98042 × 10$^{-4}$
A6 = −6.41063 × 10$^{-6}$
A8 = −3.89410 × 10$^{-7}$
A10 = −2.76002 × 10$^{-8}$
A12 = −8.86626 × 10$^{-10}$ r13

ε = 1.0000
A4 = 4.82903 × 10$^{-4}$
A6 = −6.44026 × 10$^{-6}$
A8 = −2.34160 × 10$^{-7}$
A10 = −1.86837 × 10$^{-8}$
A12 = −1.24068 × 10$^{-9}$ r18

ε = 1.0000
A4 = −2.45141 × 10$^{-3}$
A6 = −1.30167 × 10$^{-4}$
A8 = 3.17189 × 10$^{-6}$
A10 = −8.86310 × 10$^{-7}$
A12 = 1.41388 × 10$^{-8}$ r19

ε = 1.0000
A4 = −1.93194 × 10$^{-3}$
A6 = −3.41642 × 10$^{-5}$
A8 = −3.95754 × 10$^{-6}$
A10 = 4.26658 × 10$^{-7}$
A12 = −1.55762 × 10$^{-8}$

TABLE 3

3rd embodiment $f = 5.10\sim16.00\sim48.70$
$Fno. = 2.54\sim3.30\sim4.10$

| Radius of Curvature | Axial Distance | Refractive Index | Abbe Number |
|---|---|---|---|
| r1 = 39.059 | | | |
| | d1 = 0.60 | N1 = 1.798500 | ν1 = 22.60 |
| r2 = 22.737 | | | |
| | d2 = 2.77 | N2 = 1.606702 | ν2 = 58.55 |
| r3 = −419.738 | | | |
| | d3 = 0.10 | | |
| r4 = 20.512 | | | |
| | d4 = 1.85 | N3 = 1.533514 | ν3 = 64.67 |
| r5 = 58.529 | | | |
| | d5 = 0.50~10.75~17.40 | | |
| r6* = 52.394 | | | |
| | d6 = 0.60 | N4 = 1.507482 | ν4 = 67.68 |
| r7 = 5.322 | | | |
| | d7 = 4.19 | | |
| r8 = −5.595 | | | |
| | d8 = 0.60 | N5 = 1.753925 | ν5 = 51.59 |
| r9 = 12.917 | | | |
| | d9 = 1.09 | N6 = 1.825096 | ν6 = 23.28 |
| r10 = −23.539 | | | |
| | d10 = 9.91~4.22~0.10 | | |
| r11 = ∞ | | | |
| | d11 = 0.10 | | |
| r12* = 5.654 | | | |
| | d12 = 1.68 | N7 = 1.678390 | ν7 = 54.56 |
| r13* = −41.032 | | | |
| | d13 = 0.65 | | |
| r14 = 22.164 | | | |
| | d14 = 0.67 | N8 = 1.848015 | ν8 = 28.52 |
| r15 = 4.767 | | | |
| | d15 = 0.16 | | |
| r16 = 5.144 | | | |
| | d16 = 1.75 | N9 = 1.487490 | ν9 = 70.44 |
| r17 = −13.551 | | | |
| | d17 = 5.43~5.73~6.85 | | |
| r18* = −27.889 | | | |
| | d18 = 2.00 | N10 = 1.754500 | ν10 = 51.57 |
| r19* = −27.895 | | | |
| | d19 = 0.50~4.60~8.15 | | |
| r20 = ∞ | | | |
| | d20 = 3.40 | | |
| r21 = ∞ | | | |

[Aspherical Coefficient]

r6

ε = 1.0000
A4 = 3.48396 × 10⁻⁴
A6 = −5.01115 × 10⁻⁶
A8 = 3.25987 × 10⁻⁷
A10 = −1.00002 × 10⁻⁸
A12 = 1.49735 × 10⁻¹⁰ r12

ε = 1.0000
A4 = −4.31369 × 10⁻⁴
A6 = −5.88931 × 10⁻⁶
A8 = −2.76220 × 10⁻⁷
A10 = −1.52910 × 10⁻⁸
A12 = −8.02704 × 10⁻¹⁰ r13

ε = 1.0000
A4 = 4.58274 × 10⁻⁴
A6 = −3.71803 × 10⁻⁶
A8 = −1.61314 × 10⁻⁷
A10 = −1.21915 × 10⁻⁸
A12 = −2.76871 × 10⁻¹⁰ r18

ε = 1.0000

TABLE 3-continued

3rd embodiment

A4 = −2.35216 × 10⁻³
A6 = −1.16054 × 10⁻⁴
A8 = 3.75885 × 10⁻⁶
A10 = −7.41101 × 10⁻⁷
A12 = 1.09257 × 10⁻⁸ r19

ε = 1.0000
A4 = −1.89209 × 10⁻³
A6 = −2.32398 × 10⁻⁵
A8 = −3.46526 × 10⁻⁶
A10 = 3.73703 × 10⁻⁷
A12 = −1.39853 × 10⁻⁸

TABLE 4

4th embodiment $f = 5.10\sim16.00\sim48.70$
$Fno. = 2.45\sim3.28\sim4.10$

| Radius of Curvature | Axial Distance | Refractive Index | Abbe Number |
|---|---|---|---|
| r1 = 44.002 | | | |
| | d1 = 0.60 | N1 = 1.847692 | ν1 = 27.24 |
| r2 = 24.388 | | | |
| | d2 = 2.67 | N2 = 1.560764 | ν2 = 62.06 |
| r3 = −401.239 | | | |
| | d3 = 0.10 | | |
| r4 = 21.692 | | | |
| | d4 = 2.17 | N3 = 1.487490 | ν3 = 70.44 |
| r5 = 91.819 | | | |
| | d5 = 0.50~12.10~20.62 | | |
| r6* = 46.396 | | | |
| | d6 = 0.60 | N4 = 1.487490 | ν4 = 70.44 |
| r7 = 5.515 | | | |
| | d7 = 4.44 | | |
| r8 = −5.760 | | | |
| | d8 = 0.60 | N5 = 1.754500 | ν5 = 51.57 |
| r9 = 15.078 | | | |
| | d9 = 1.02 | N6 = 1.798500 | ν6 = 22.60 |
| r10 = −21.876 | | | |
| | d10 = 9.79~3.88~0.10 | | |
| r11 = ∞ | | | |
| | d11 = 0.10 | | |
| r12* = 5.692 | | | |
| | d12 = 1.48 | N7 = 1.676812 | ν7 = 54.64 |
| r13* = −39.990 | | | |
| | d13 = 0.73 | | |
| r14 = 21.625 | | | |
| | d14 = 0.64 | N8 = 1.848032 | ν8 = 28.59 |
| r15 = 4.759 | | | |
| | d15 = 0.15 | | |
| r16 = 5.165 | | | |
| | d16 = 1.70 | N9 = 1.487490 | ν9 = 70.44 |
| r17 = −13.351 | | | |
| | d17 = 5.81~6.30~7.84 | | |
| r18* = −41.031 | | | |
| | d18 = 2.00 | N10 = 1.836392 | ν10 = 41.22 |
| r19* = −44.104 | | | |
| | d19 = 0.50~4.81~8.04 | | |
| r20 = ∞ | | | |
| | d20 = 3.40 | | |
| r21 = ∞ | | | |

[Aspherical Coefficient]

r6

ε = 1.0000
A4 = 3.27016 × 10⁻⁴
A6 = −4.67858 × 10⁻⁶
A8 = 3.36614 × 10⁻⁷

TABLE 4-continued

4th embodiment

| | |
|---|---|
| A10 = | $-9.91892 \times 10^{-9}$ |
| A12 = | $1.39748 \times 10^{-10}$ | r12

| | |
|---|---|
| ε = | 1.0000 |
| A4 = | $-4.28500 \times 10^{-4}$ |
| A6 = | $-5.56963 \times 10^{-6}$ |
| A8 = | $-2.02536 \times 10^{-7}$ |
| A10 = | $-9.89528 \times 10^{-8}$ |
| A12 = | $-1.01218 \times 10^{-10}$ | r13

| | |
|---|---|
| ε = | 1.0000 |
| A4 = | $4.56668 \times 10^{-4}$ |
| A6 = | $-3.40927 \times 10^{-6}$ |
| A8 = | $-1.19646 \times 10^{-7}$ |
| A10 = | $-8.40340 \times 10^{-9}$ |
| A12 = | $-1.30026 \times 10^{-10}$ | r18

| | |
|---|---|
| ε = | 1.0000 |
| A4 = | $-2.35236 \times 10^{-3}$ |
| A6 = | $-1.12583 \times 10^{-4}$ |
| A8 = | $3.65821 \times 10^{-6}$ |
| A10 = | $-7.05064 \times 10^{-7}$ |
| A12 = | $3.09184 \times 10^{-8}$ | r19

| | |
|---|---|
| ε = | 1.0000 |
| A4 = | $-2.02065 \times 10^{-3}$ |
| A6 = | $-2.45628 \times 10^{-5}$ |
| A8 = | $-3.07400 \times 10^{-6}$ |
| A10 = | $4.08089 \times 10^{-7}$ |
| A12 = | $-1.33815 \times 10^{-8}$ |

Figures 5A, 5B, 5C:
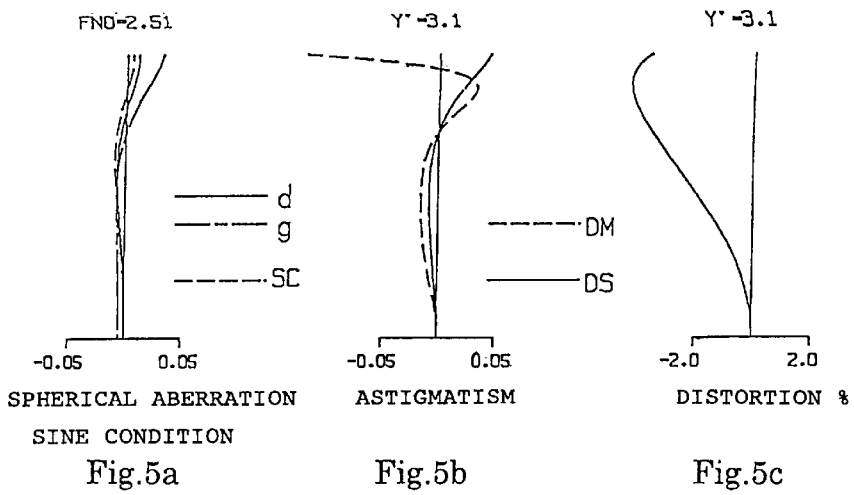
FIGS. 5(a) to 5(i) are graphic representations of aberrations of the zoom lens system of the first embodiment.
Figures 5D, 5E, 5F:
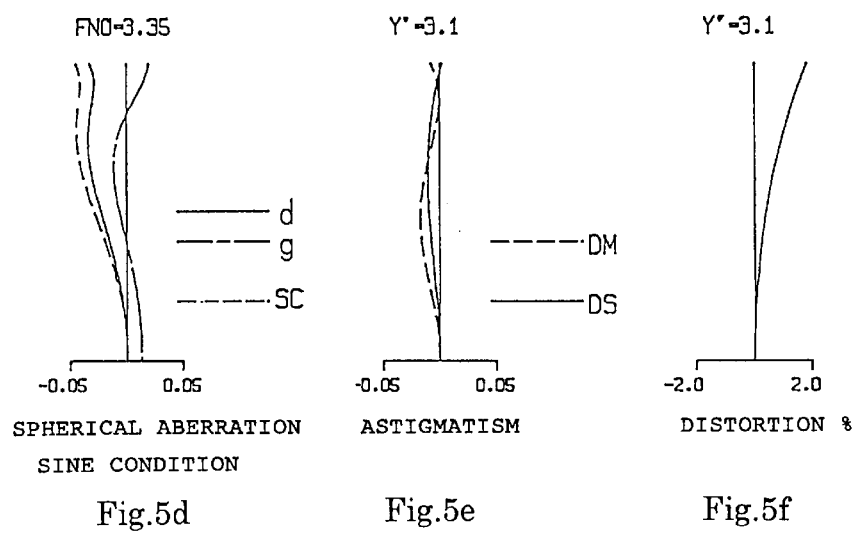
Figures 5G, 5H, 5I:
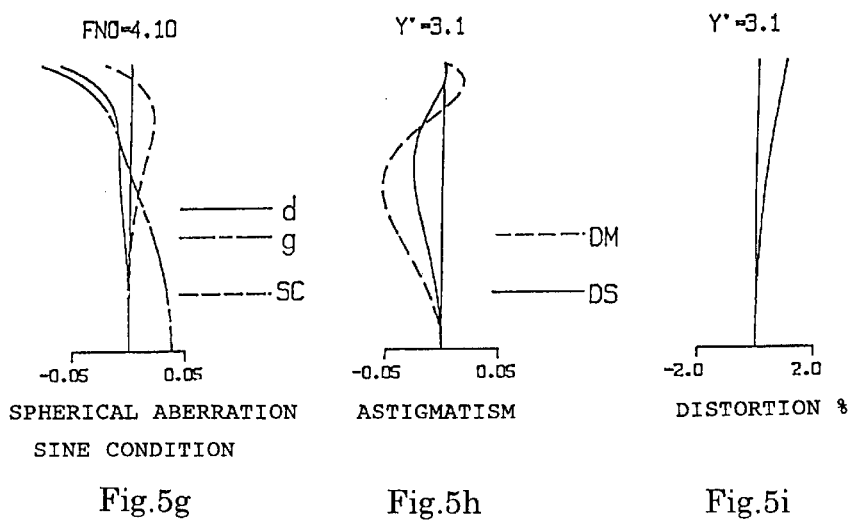
Figure 7A:
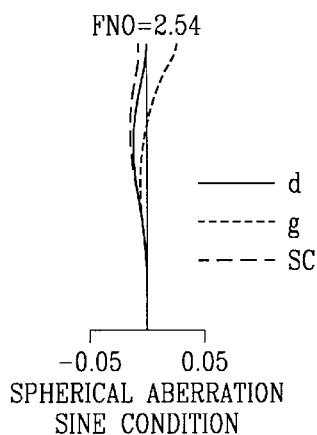
FIGS. 7(a) to 7(i) are graphic representations of aberrations of the zoom lens system of the third embodiment.
Figure 7B:
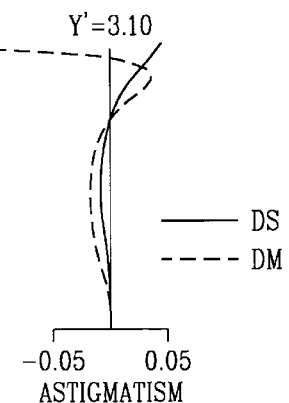
Figure 7C:
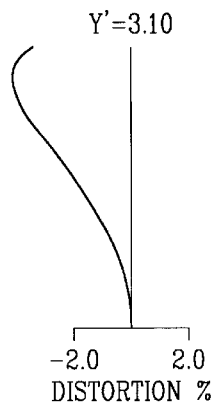
Figure 7D:
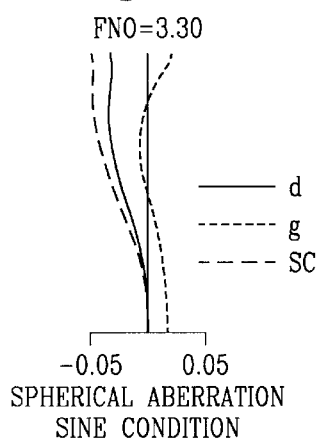
Figure 7E:
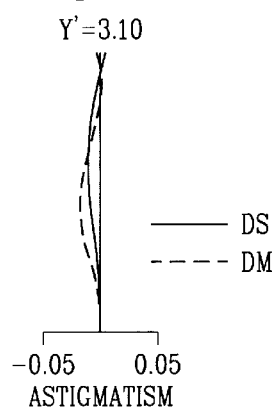
Figure 7F:
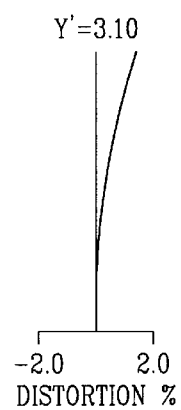
Figure 7G:
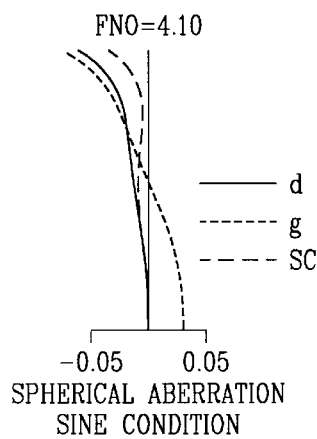
Figure 7H:
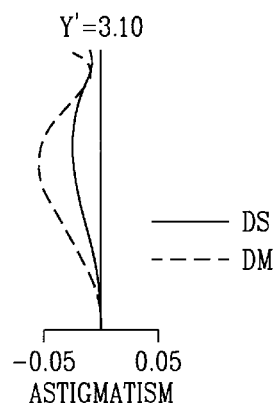
Figure 7I:
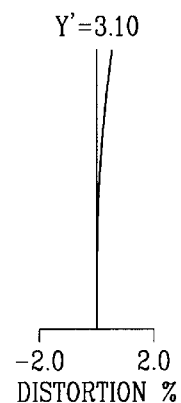

FIGS. 5 to 8 are graphic representations of aberrations of the first to the fourth examples. In these FIGS, (a) to (c) show aberrations at the shortest focal length condition, FIGS. (d) to (f) show aberrations at the middle focal length condition, and FIGS. (g) to (i) show aberrations at the longest focal length condition. In FIGS. (a), (d) and (g) showing spherical aberration, the solid line d represents the d-line and the broken line SC represents sine condition. In FIGS. (b), (e) and (h) showing astigmatism, the solid line DS and the broken line DM represent astigmatisms of the sagittal ray and the meridional ray, respectively. FIGS. (c), (f) and (i) show distortion.

In the representations of spherical aberration, the solid line d represents the amount of spherical aberration to the d-line, the alternate long and short dash line represents the amount of spherical aberration to the g-line, and the broken line SC represents the unsatisfied amount of sine condition. In the representations of astigmatism, the solid line DS represents the sagittal image plane and the dotted line DM represents the meridional image plane. The longitudinal axes of the representations of spherical aberration represent the f-number of the ray. The longitudinal axes of the representations of astigmatism and distortion represent the maximum image heights Y'.

The values of the examples corresponding to the conditions are shown in TABLEs 5, 6 and 7. In the data, the letter E following the numbers represents the exponent; for example, 1.0E-2 represents $1.0*10^{-2}$. Hmax represents the maximum effective aperture.

TABLE 5

| | 1st Embodiment | 2nd Embodiment | 3rd Embodiment | 4th Embodiment |
|---|---|---|---|---|
| Condition (1) | 7.30 | 7.34 | 6.74 | 7.54 |
| Condition (2) | -0.97 | -0.97 | -0.96 | -1.02 |
| Condition (3) | 1.62 | 1.62 | 1.62 | 1.60 |
| Condition (4) | 9.43 | 9.41 | 9.33 | 9.39 |
| Condition (5) | 0.68 | 0.70 | 0.69 | 0.70 |
| Condition (6) | -1.08 | -1.08 | -1.08 | -1.06 |
| Condition (7) | 24.2 | 23.8 | 22.6 | 27.2 |
| Condition (8) | 58.8, 70.4 | 58.6, 70.4 | 58.6, 64.7 | 56.1, 70.4 |
| Condition (9) | 2.09 | 2.09 | 1.69 | 2.10 |
| Condition (10) | 1.14 | 1.16 | 1.24 | 1.10 |
| Condition (11) | 1.29 | 1.84 | 1.27 | 1.31 |
| Condition (12) | 7.84 | 7.84 | 7.84 | 7.85 |
| Condition (13) | 0.69 | 0.69 | 0.69 | 0.75 |
| Condition (14) | 3.73 | 3.72 | 3.77 | 3.57 |
| Condition (15) | 7.09 | 7.11 | 6.91 | 6.78 |

TABLE 6

The value of Condition (16)

| | 1st Embodiment | | 2nd Embodiment | |
|---|---|---|---|---|
| | r12 | r13 | r12 | r13 |
| 0.1 Hmax | -0.5362E-5 | -0.7809E-6 | -0.6031E-5 | -0.1361E-5 |
| 0.2 Hmax | -0.4320E-4 | -0.6221E-5 | -0.4858E-4 | -0.1081E-4 |
| 0.3 Hmax | -0.1476E-3 | -0.9956E-4 | -0.1659E-3 | -0.3606E-4 |
| 0.4 Hmax | -0.3565E-3 | -0.4882E-4 | -0.4008E-3 | -0.8391E-4 |
| 0.5 Hmax | -0.7153E-3 | -0.9373E-4 | -0.8047E-3 | -0.1591E-3 |
| 0.6 Hmax | -0.1283E-2 | -0.1579E-3 | -0.1448E-2 | -0.2646E-3 |
| 0.7 Hmax | -0.2144E-2 | -0.2413E-3 | -0.2438E-2 | -0.3945E-3 |
| 0.8 Hmax | -0.3427E-2 | -0.3396E-3 | -0.3957E-2 | -0.5308E-3 |
| 0.9 Hmax | -0.5343E-2 | -0.4397E-3 | -0.6336E-2 | -0.6272E-3 |
| 1.0 Hmax | -0.8237E-2 | -0.5130E-3 | -0.1018E-1 | -0.5817E-3 |

TABLE 6

The value of Condition (16)

| | 1st Embodiment | | 2nd Embodiment | |
|---|---|---|---|---|
| | r12 | r13 | r12 | r13 |
| 0.1 Hmax | -0.4984E-5 | -0.6947E-6 | -0.4297E-5 | -0.6332E-6 |
| 0.2 Hmax | -0.4014E-4 | -0.5536E-5 | -0.3458E-4 | -0.5049E-5 |
| 0.3 Hmax | -0.1371E-3 | -0.1855E-4 | -0.1179E-3 | -0.1694E-4 |
| 0.4 Hmax | -0.3309E-3 | -0.4351E-4 | -0.2836E-3 | -0.3981E-4 |
| 0.5 Hmax | -0.6629E-3 | -0.8365E-4 | -0.5654E-3 | -0.7679E-4 |
| 0.6 Hmax | -0.1186E-2 | -0.1413E-3 | -0.1004E-2 | -0.1304E-3 |
| 0.7 Hmax | -0.1975E-2 | -0.2169E-3 | -0.1653E-2 | -0.2023E-3 |
| 0.8 Hmax | -0.3141E-2 | -0.3075E-3 | -0.2584E-2 | -0.2922E-3 |
| 0.9 Hmax | -0.4858E-2 | -0.4039E-3 | -0.3906E-2 | -0.3975E-3 |
| 1.0 Hmax | -0.7411E-2 | -0.4854E-3 | -0.5579E-2 | -0.5116E-3 |

As described above, according to the present invention, a zoom lens system can be provided that is compact although having high magnification and high image quality.

Therefore, application of the zoom lens system of the present invention to a taking optical system for digital cameras contributes to performance improvement and size reduction of the camera.

What is claimed is:

1. A zoom lens system, comprising from an object side:
   a first lens unit having a positive optical power;
   a second lens unit having a negative optical power;
   a third lens unit having a positive optical power; and
   a succeeding lens unit,
   wherein the first lens units and the third lens unit monotonically move toward the object side during zooming from a shortest focal length condition to a longest focal length condition, and wherein the following conditions are satisfied:

$$0.7 < \frac{m1}{Z} < 3.0$$

$$1 < \frac{\max(T1, T2, T3, T4)}{fw} < 4$$

where

Ti is an axial thickness of the i-th lens unit and max(T1, T2,T3,T4) is a maximum value thereof, m1 is a movement amount (mm) of the first lens unit during zooming from the shortest focal length condition to the longest focal length condition, fw is an overall focal length of the zoom lens system at the shortest focal length condition, and Z is a zoom ratio (the focal length at the shortest focal length condition/a focal length at the longest focal length condition).

2. A zoom lens system as claimed in claim 1, wherein the succeeding lens unit has a positive optical power.

3. A zoom lens system as claimed in claim 1, wherein a composite optical power of the third lens unit and the succeeding lens unit is a positive optical power.

4. A zoom lens system as claimed in claim 1, wherein the succeeding lens unit has a negative optical power.

5. A zoom lens system as claimed in claim 1, wherein the following condition is satisfied:

$$3.0 < \frac{f1}{fw} < 9.0$$

where f1 is a focal length of the first lens unit.

6. A zoom lens system as claimed in claim 1, wherein the following condition is satisfied:

$$-1.3 < \frac{f2}{fw} < 0.7$$

where f2 is a focal length of the second lens unit.

7. A zoom lens system as claimed in claim 1, wherein the following condition is satisfied:

$$1.1 < \frac{f34w}{fw} < 1.9$$

where f34w is a composite focal length of the third lens unit and the succeeding lens unit at the shortest focal length condition.

8. A zoom lens system as claimed in claim 1, wherein the following condition is satisfied:

1.0<img*R<15.0 where img is a maximum image height (mm), and

R is an effective aperture (mm) of a lens surface in the zoom lens system situated on a most image side except a filter.

9. A zoom lens system as claimed in claim 1, wherein the following condition is satisfied:

$$-1.6 < \frac{R2n}{f2} < -0.6$$

where

R2n is a radius of curvature of a concave surface of a first sub unit of the second lens unit, and f2 is a focal length of the second lens unit.

10. A zoom lens system as claimed in claim 1, wherein the third lens unit has a positive lens element at the most object side, and wherein the positive lens element satisfies the following condition:

$$0.1 < \frac{Ra}{f34w} < 3.0$$

where

Ra is a radius of curvature of an image side surface of the positive lens element disposed on a most object side of the third and succeeding lens units, and f34w is a composite focal length of the third lens unit and the succeeding lens unit.

11. A zoom lens system as claimed in claim 1, wherein the first lens unit is moved during zooming, and wherein the following condition is satisfied:

$$0.8 < \frac{M1wm}{M1mt} < 2.5$$

where

M1wm is a movement amount of the first lens unit from the shortest focal length condition to a middle focal length condition, and M1wt is a movement amount of the first lens unit from the middle focal length condition to the longest focal length condition, wherein the middle focal length condition is obtained by $\overline{fw*ft}$ where fw is the focal length at the shortest focal length condition and ft is the focal length at the longest focal length condition.

12. A zoom lens system as claimed in claim 1, wherein the following condition is satisfied:

$$6 < \frac{Lw}{fw} < 10$$

where

Lw is an overall length (from a zoom lens system front end to an image plane) of the zoom lens system at the shortest focal length condition.

13. A zoom lens system as claimed in claim 1, wherein the following condition is satisfied:

$$0.2 < \frac{\Delta\beta3}{\Delta\beta2} < 1.0$$

where $\Delta\beta2$ is a lateral magnification ratio (a lateral magnification at the longest focal length condition/a lateral magnification at the shortest focal length condition) of the second lens unit, and $\Delta\beta3$ is a lateral magnification ratio of the third lens unit.

14. A zoom lens system as claimed in claim 1, wherein the following condition is satisfied:

$$3.5 < \frac{\beta t2}{\beta w2} < 6.5$$

where $\beta t2$ is a lateral magnification of the second lens unit at the longest focal length condition, and $\beta w2$ is a lateral magnification of the second lens unit at the shortest focal length condition.

15. A zoom lens system as claimed in claim 1, wherein the following condition is satisfied:

$$4.5 < \left|\frac{ft}{f12w}\right| < 15.0$$

where ft is a focal length at the longest focal length condition, and f12w is a composite focal length of the first lens unit and the second lens unit at the shortest focal length condition.

16. A zoom lens system as claimed in claim 1, wherein the succeeding lens unit has at least one aspherical surface satisfying the range defined by the condition:

$$-0.1 < \phi \cdot (N' - N) \cdot \frac{d}{dH}\{X(H) - X0(H)\} < 0$$

where $\phi$ is an optical power of the aspherical surface,

N is a refractive index to a d-line of a medium on the object side of the aspherical surface, N' is a refractive index to the d-line of a medium on an image side of the aspherical surface, H represents a height in a direction perpendicular to an optical axis, X(H) represents an amount of axial displacement at the height H (with a vertex as a reference), X0(H) represents an amount of axial displacement of a reference spherical surface at the height H.

17. A zoom lens system as claimed in claim 1, wherein the succeeding lens unit has a positive optical power.

18. A zoom lens system as claimed in claim 1, wherein a composite optical power of the third lens unit and the succeeding lens unit is a positive optical power.

19. A zoom lens system as claimed in claim 1, wherein the succeeding lens unit has a negative optical power.

20. A zoom lens system as claimed in claim 1, wherein the succeeding lens unit has a positive optical power.

21. A zoom lens sysem as claimed in claim 1, wherein a composite optical power of the third lens unit and the succeeding lens unit is a positive optical power.

22. A zoom lens system as claimed in claim 1, wherein the succeeding lens unit has a negative optical power.

23. A zoom lens system for forming an image of an object on a solid state imaging device, comprising, from an object side:

a first lens unit having a positive optical power;

a second lens unit having a negative optical power;

a third lens unit having a positive optical power; and a succeeding lens unit; and a filter including an optical low-pass filter, wherein the first lens unit and the third lens unit monotonically move toward the object side during zooming from a shortest focal length condition to a longest focal length condition, and wherein the following conditions are satisfied:

$$0.7 < \frac{m1}{Z} < 3.0$$

$$1 < \frac{\max(T1, T2, T3, T4)}{fw} < 4$$

where

Ti is an axial thickness of the i-th lens unit and max(T1, T2,T3,T4) is a maximum value thereof, m1 is a movement amount (mm) of the first lens unit during zooming from the shortest focal length condition to the longest focal length condition, fw is an overall focal length of the zoom lens system at the shortest focal length condition, and Z is a zoom ratio (the focal length at the shortest focal length condition/a focal length at the longest focal length condition).

24. An imaging apparatus comprising:

a solid state imaging device;

a zoom lens system for forming an image of an object on the solid state imaging device, the zoom lens system comprising, from an object side:

a first lens unit having a positive optical power;

a second lens unit having a negative optical power;

a third lens unit having a positive optical power; and a succeeding lens unit; and a filter including an optical low-pass filter, wherein the first lens unit and the third lens unit monotonically move toward the object side during zooming from a shortest focal length condition to a longest focal length condition, and wherein the following conditions are satisfied:

$$0.7 < \frac{m1}{Z} < 3.0$$

$$1 < \frac{\max(T1, T2, T3, T4)}{fw} < 4$$

where

Ti is an axial thickness of the i-th lens unit and max(T1, T2,T3,T4) is a maximum value thereof, m1 is a movement amount (mm) of the first lens unit during zooming from the shortest focal length condition to the longest focal length condition, fw is an overall focal length of the zoom lens system at the shortest focal length condition, and Z is a zoom ratio (the focal length at the shortest focal length condition/a focal length at the longest focal length condition).

* * * * *

UNITED STATES PATENT AND TRADEMARK OFFICE
CERTIFICATE OF CORRECTION

PATENT NO.    : 6,191,895 B1
DATED         : February 20, 2001
INVENTOR(S)   : Tetsuya Arimoto et al.

It is certified that error appears in the above-identified patent and that said Letters Patent is hereby corrected as shown below:

<u>Column 22,</u>
Line 41, delete "$\overline{fw * ft}$", and insert -- $\sqrt{fw * ft}$ --.

Signed and Sealed this

Eighth Day of January, 2002

Attest:

JAMES E. ROGAN
*Attesting Officer*  *Director of the United States Patent and Trademark Office*